July 12, 1932.  H. MOTE  1,867,521
AGRICULTURAL IMPLEMENT
Filed March 4, 1930  2 Sheets-Sheet 1
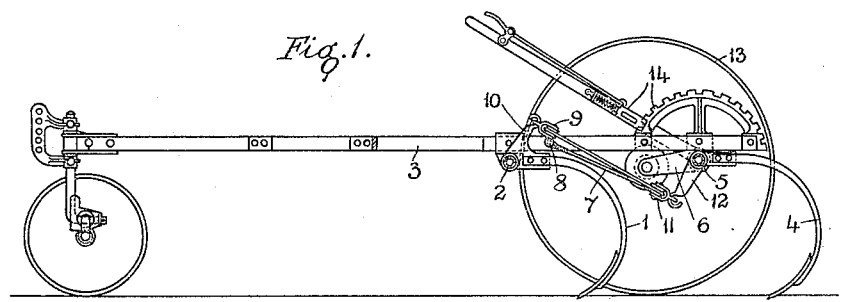
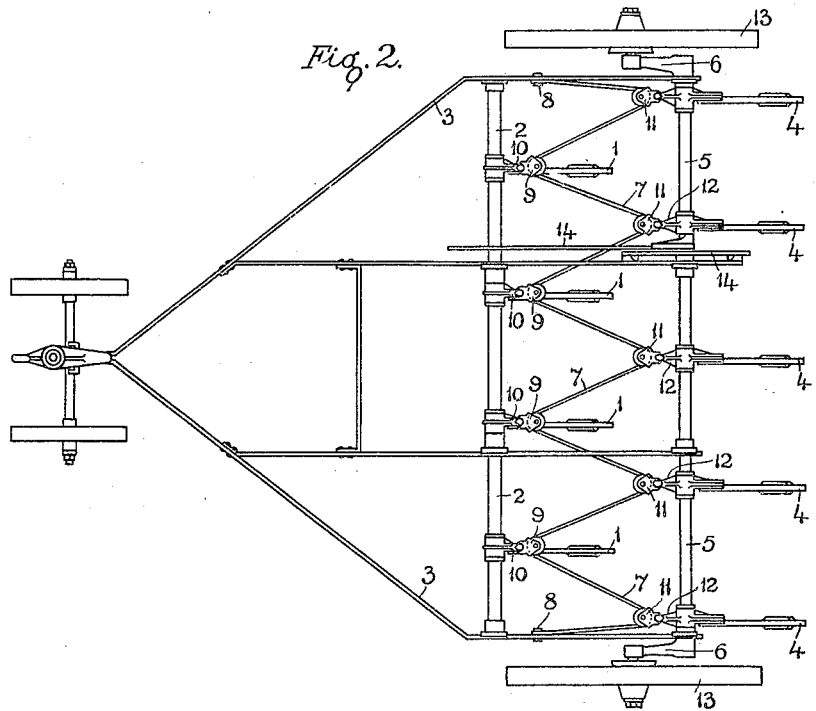
INVENTOR
Horace Mote,
BY
ATTORNEY July 12, 1932.  H. MOTE  1,867,521
AGRICULTURAL IMPLEMENT
Filed March 4, 1930   2 Sheets-Sheet 2
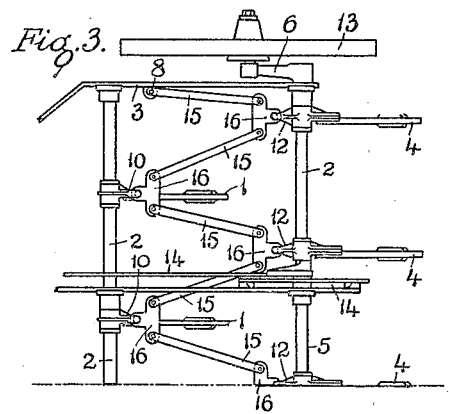
INVENTOR
Horace Mote,
BY
ATTORNEY Patented July 12, 1932

1,867,521

UNITED STATES PATENT OFFICE

HORACE MOTE, OF LONDON, ENGLAND

AGRICULTURAL IMPLEMENT

Application filed March 4, 1930, Serial No. 433,135, and in Great Britain March 26, 1929.

This invention relates to cultivators and other agricultural implements which are provided with a number of tines, points, shares or the like for digging into or working the soil. The chief object of the present invention is to provide means whereby the tines co-operate so as to work properly in all classes of soil, and in such manner that the pressure on the tines during working is equalized or substantially equalized, the said means serving especially to prevent the tines as a whole from being moved out of the soil in the event that any one or more of them should encounter an obstruction which otherwise might lift the machine and the tines with the result that the latter would only skim the surface of the soil.

According to this invention the several tines of the implement (or a set of tines) are independently movable and they are so interconnected that, if any one of them tends to be raised or is raised, as for instance by encountering undue resistance or obstruction during working, the other tines connected thereto are caused to be maintained in or forced further into the ground, thus providing a kind of compensating or equalizing action.

The interconnection of the several tines of the implement (or the several tines of each set) may be effected by means of a cable (chain, links or the like) so that, in the event that a tine should tend to be raised by meeting an obstruction, the cable is tensioned and allows this tine to be raised, but the tension on the cable causes the other tines to be acted upon in such manner that they tend to be forced further into the soil. The tines are pivotally or otherwise mounted so as to be angularly movable and the connection of the several tines as aforesaid permits of continuous rocking movement or vibration of the tines due to different resistances encountered during working.

The invention will be clearly understood from the following description aided by the examples shown on the annexed drawings in which:

Figure 1 is a side elevation, and
Figure 2 is a plan of a cultivator having a preferred embodiment of my invention applied thereto.

Figure 3 is a plan of part of a cultivator embodying a modified form of the invention.

In the example shown in Figures 1 and 2, which construction comprises two sets of pivoted tines, say a front row of tines 1 pivotally or otherwise mounted on a transverse tube or rod 2 carried in the frame 3 of the implement, and a back row of tines 4 pivotally or otherwise mounted on the axle 5 which is provided with cranks 6 that carry the travelling wheels 13, the tines 1 of the front row being disposed in staggered relation to the tines 4 of the rear row. A cable 7, chain or equivalent, which is suitably secured at its ends 8 to the frame 3, is conected to the tines 1, 4 of the two rows alternately, i. e. it extends from a tine 1 of the front row to a tine 4 of the rear row then to a tine 1 of the front row, and so on, said cable 7 passing around pulleys 9 or the like attached to arms 10 which extend upwardly from the front pivoted tines 1 and around pulleys 11 or the like attached to arms 12 which depend from the rear pivoted tines 4. The pulleys 9, 11 are loosely attached to hook-like ends on the arms 10, 12 so as to permit of the necessary freedom of movement of the said pulleys 9, 11 during working.

The arrangement is such that, when the point of a tine in either row is lifted by encountering an obstruction, angular movement is imparted to its arm, 10 or 12, which, through the cable connection, causes angular movement of the other tine arms in directions which result in all the other tines being forced further into the soil.

In the case of a cultivator having tines at the rear of the wheels 13 to remove the wheel tracks during working, the ends of the cable 7 may be attached to arms on such tines which are pivotally mounted on pins or stubs extending from brackets or fixed arms on the rear part or axle of the implement, but I prefer that these particular tines may carry pulleys and that the cable 7 be passed around the same and then anchored at its ends to the frame 3 of the implement.

The depth adjusting or lifting mechanism 14 may be of any suitable kind and the seat, when required, may be disposed over or rearwardly beyond the wheel axle.

When the implement is not working and the tines 1 and 4 are raised to enable it to travel along the road or for turning at the headlands, the tines are suspended loosely without however being disconnected from the cable 7, but if desired, means for tensioning the cable 7 or locking the tines 1, 4 may be provided to prevent undue swinging of the tines when in the inoperative position.

Instead of interconnecting the tines 1, 4 by a cable they may be connected by links 15 or rods (see Figure 3) which may be pivotally connected to pivoted bars 16 or rails on the tines; or chains may be used for connecting the tines and may be fixed to curved bearing members on the tines.

The term "working arms" in the appended claims includes any parts adapted to act upon the ground or the crop to be worked, and the term "flexible means" in said claims includes means, such as the chain or cable shown in Figures 1 and 2, or the links shown in Figure 3 which is operative, when any of the working arms is caused to rock rearwardly by meeting an obstruction, to cause the other working arms to rock forwardly and more deeply penetrate the soil.

What I do claim as my invention and desire to obtain by Letters Patent is:

1. The combination of a traveling frame with working arms pivotally mounted thereon for forward and backward movement and arranged in front and rear rows in staggered formation, upwardly extending arms on the front pivoted arms, depending arms on the rear pivoted arms, and flexible means connecting the upwardly and last-named downwardly extending arms alternately, whereby when one or more of said working arms are moved backward relative to the frame, a force tending to produce forward movement relative to the frame is exerted on all the other working arms.

2. An implement of the character described, comprising a travelling frame, a front row of working arms depending from said frame each of said arms being mounted adjacent its upper end to rock on an axis extending transversely of said frame, a rear row of working arms also depending from said frame each of said arms being mounted adjacent its upper end to rock on an axis substantially parallel to the axes of the first named working arms, the working arms of the front row being in staggered relation to those of the rear row and the working arms of one row having arms extending above the axes on which they rock and the working arms of the other row having arms extending below the axes on which they rock, and means movably and alternately connecting the upwardly extending arms of one row to the depending arms of the other row, whereby rearward movement of any one of said working arms causes forward movement of the other working arms.

In testimony whereof I have hereunto set my hand.

HORACE MOTE.